US006621407B1

(12) United States Patent
Goodwin, III

(10) Patent No.: US 6,621,407 B1
(45) Date of Patent: Sep. 16, 2003

(54) AUXILIARY DISPLAY RECOGNITION SYSTEM AND METHOD FOR AN ELECTRONIC PRICE LABEL SYSTEM

(75) Inventor: John C. Goodwin, III, Suwanee, GA (US)

(73) Assignee: NCR Corporation, Dayton, OH (US)

( * ) Notice: Subject to any disclaimer, the term of this patent is extended or adjusted under 35 U.S.C. 154(b) by 1430 days.

(21) Appl. No.: 08/603,005

(22) Filed: Feb. 16, 1996

(51) Int. Cl.[7] .................................................. G06F 7/12
(52) U.S. Cl. ..................................................... 340/5.91
(58) Field of Search .................... 340/825.35, 825.17, 340/5.91; 235/383, 454; 395/216, 220; 345/2, 1; 364/479.01, 479.08; 705/16, 20, 21

(56) References Cited

U.S. PATENT DOCUMENTS

| 4,002,886 A | 1/1977 | Sundelin ................ 235/61.7 R |
| 4,500,880 A | 2/1985 | Gomersall et al. ...... 340/825.35 |
| 4,602,151 A * | 7/1986 | Hellsberg .................... 235/383 |
| 4,924,363 A | 5/1990 | Kornelson ................... 362/125 |
| 5,172,314 A | 12/1992 | Poland et al. ................ 364/401 |
| 5,401,947 A * | 3/1995 | Poland ......................... 235/383 |
| 5,448,226 A | 9/1995 | Failing, Jr. et al. ..... 340/825.35 |
| 5,493,108 A * | 2/1996 | Cherry et al. ................ 235/454 |

FOREIGN PATENT DOCUMENTS

WO            WO23381        10/1994

* cited by examiner

*Primary Examiner*—Edwin C. Holloway, III
(74) *Attorney, Agent, or Firm*—Paul W. Martin; Priest & Goldstein, PLLC

(57) ABSTRACT

A system for recognizing an auxiliary display attached to an electronic price label which also recognizes a unique type designation of the auxiliary display. The system includes a number of auxiliary display recorders which sense a number of indicators on the auxiliary display. The indicators are arranged in a predetermined pattern which uniquely identifies a type designation for the auxiliary display. The system also includes an auxiliary display sensing circuit coupled to the auxiliary display recorders which determines the type designation of the auxiliary display from the pattern.

1 Claim, 6 Drawing Sheets

AUXILIARY DISPLAY RECOGNITION SYSTEM AND METHOD FOR AN ELECTRONIC PRICE LABEL SYSTEM

BACKGROUND OF THE INVENTION

The present invention relates to electronic price label (EPL) systems used in transaction establishments, and more specifically to an auxiliary display recognition system and method for an electronic price label system.

EPL systems typically include a plurality of EPLs for each merchandise item in a store. EPLs typically display the price of corresponding merchandise items on store shelves and are typically attached to a rail along the leading edge of the shelves. A store may contain thousands of EPLs to display the prices of the merchandise items. The EPLs are coupled to a central server from where information about the EPLs is typically maintained in an EPL data file. Price information displayed by the EPLs is obtained from the PLU file.

EPLs today may be wired or wireless. Wireless EPLs may employ infrared or radio frequency transmitters to transmit acknowledgment signals acknowledging receipt of messages and to relay acknowledgment signals from other EPLs to receiving devices coupled to a main EPL computer. An EPL only sends an acknowledgment if the message is addressed to it.

Items that are "On Sale" or heavily promoted within a store are typically identified by auxiliary displays, usually made of paper, called "shelf talkers" or "bibs" or "promotional tags" which are attached to shelves or current price marking devices. These paper tags must be installed and removed by store personnel.

U.S. Pat. No. 5,448,226 discusses a method for identifying EPLs on which promotional tags have been installed. However, the method is deficient because it cannot determine which type of promotional tag is installed on any given EPL. A typical retail store may have as many as ten types of promotional tags and sometimes more. It is important for store personnel to not only know when a tag is installed or should be installed, but whether the correct tag is installed.

Therefore, it would be desirable to provide a system that not only recognizes that a promotional tag has been attached to an EPL, but also determines which type of promotional tag is attached.

SUMMARY OF THE INVENTION

In accordance with the teachings of the present invention, an auxiliary display recognition system and method for an electronic price label system is provided.

The system includes a number of auxiliary display recorders which sense a number of indicators on the auxiliary display. The indicators are arranged in a predetermined pattern which uniquely identifies a type designation for the auxiliary display. The system also includes an auxiliary display sensing circuit coupled to the auxiliary display recorders which determines the type designation of the auxiliary display from the pattern.

In one embodiment, the recorders include a number of photosensors. In another embodiment, the recorders include a number of push button switches. In both embodiments, the indicators include a number of apertures.

The system also includes auxiliary display management software which compares previously stored information, associating auxiliary displays with electronic price labels, with the determined type designation to ensure that the correct auxiliary display is attached to the electronic price label.

It is accordingly an object of the present invention to provide an auxiliary display recognition system and method for an electronic price label system.

It is another object of the present invention to provide an auxiliary display recognition system and method for an electronic price label system which can determine a unique type designation of the auxiliary display.

It is another object of the present invention to provide an auxiliary display recognition system and method for an electronic price label system which can determine whether an incorrect auxiliary display is attached to a particular EPL.

BRIEF DESCRIPTION OF THE DRAWINGS

Additional benefits and advantages of the present invention will become apparent to those skilled in the art to which this invention relates from the subsequent description of the preferred embodiments and the appended claims, taken in conjunction with the accompanying drawings, in which:

DETAILED DESCRIPTION OF THE PREFERRED EMBODIMENT

Figure 1:
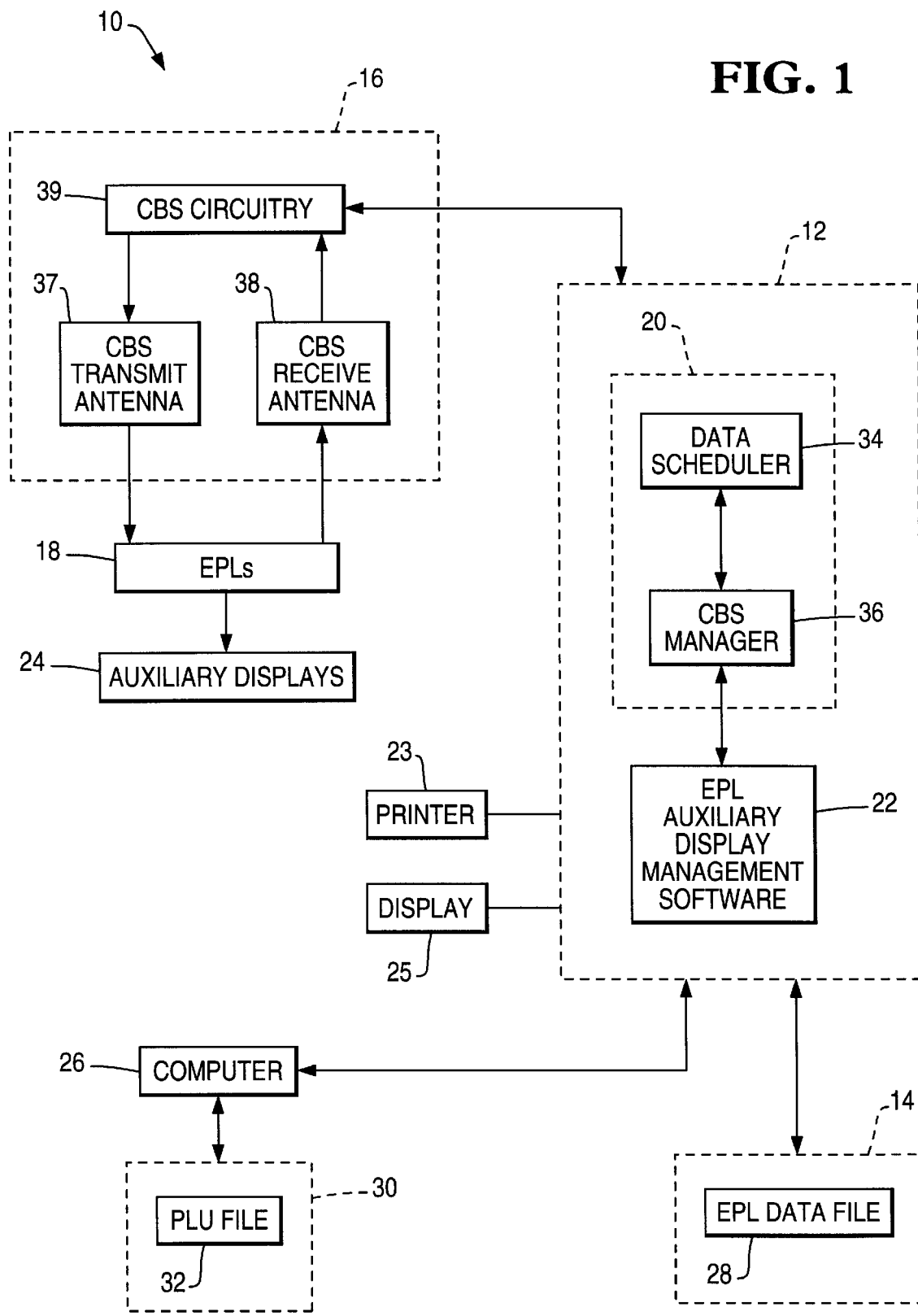
FIG. 1 is a block diagram of an EPL system.

Referring now to FIG. 1, EPL system 10 includes computer 12, storage medium 14, communication base station (CBS) 16, electronic price labels (EPLs) 18, auxiliary displays 24, computer 26, and storage medium 30.

Computer 12 executes EPL control software 20 and EPL auxiliary display management software 22. EPL control software 20 records, schedules, and transmits all messages to EPLs 18 through CBS 16, and receives and analyzes status messages from EPLs 18 through CBS 16. EPL control software 20 also maintains and uses EPL data file 28, which contains item information, EPL identification information, item price verifier information, and status information for each of EPLs 18.

Additionally, for each EPL record in EPL data file 28, there is a field containing a number, such as a binary number, which represents a type of auxiliary display 24 to be attached to the EPL, or a number indicating that no auxiliary display 24 should be attached. An operator of system 10 may update the records of each EPL 18 within EPL data file 28 individually or in batch. After a record is changed within EPL data file, store personnel correspondingly remove, add, or replace EPL auxiliary displays 24.

EPL control software 20 primarily includes data scheduler 34 and CBS manager 36. Data scheduler 34 schedules EPL price change messages to be sent to EPLs 18 through CBS 16.

Figure 2:
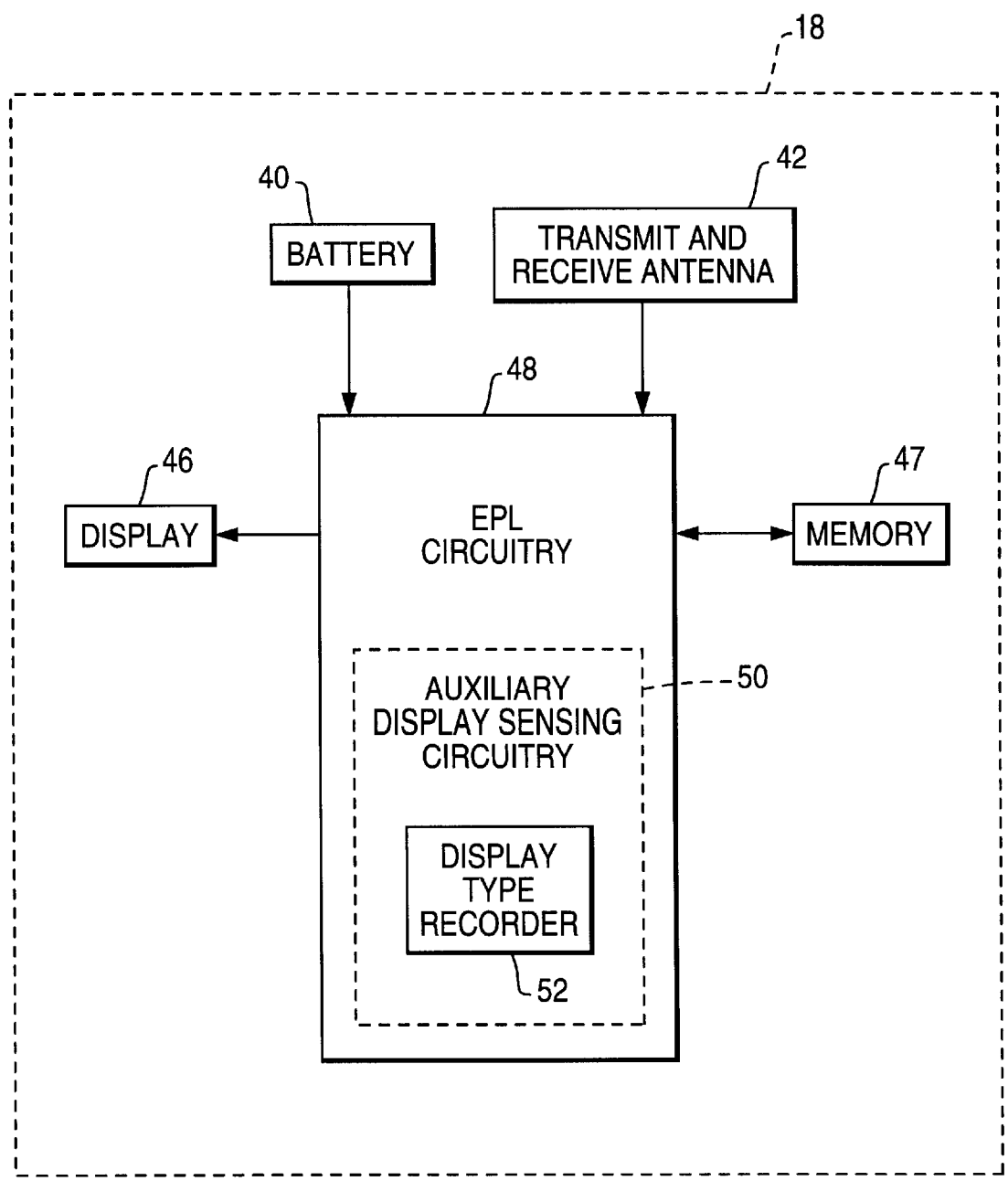
FIG. 2 is a block diagram of an EPL.

EPL auxiliary display management software 22 determines whether auxiliary displays 24 are connected to EPLs 18 by reading a binary number stored in memory 47 and set by EPL circuitry 48 (FIG. 2). EPL auxiliary display management software 22 monitors each EPL to determine whether an EPL has the proper auxiliary display 24, or should not have a tag or auxiliary display. EPL auxiliary display management software 22 notifies store personnel by displaying an error message on monitor 25, printing an error in a report using printer 23, or using any other type of known error notification means.

Storage medium 14 is preferably a fixed disk drive. Storage medium 14 stores EPL data file 28.

CBS 16 preferably includes one transmit antenna 37 and one to four receive antennas 38 for transmitting and receiving messages between CBS 16 and EPLs 18. CBS 16 includes CBS circuitry 39 which controls operation of CBS 16. EPL system 10 preferably includes a plurality of CBSs 16 connected together in series.

CBS manager 36 schedules transmission of price change messages to EPLs 18 and the reception of status messages from EPLs 18 for predetermined time slots. CBS manager 36 also schedules the reception of messages acknowledging the presence of auxiliary displays 24 from those EPLs having auxiliary displays 24.

Auxiliary displays 24 preferably include printed tags made of paper, cardboard, plastic, vinyl, or other suitable media, and contain announcements, slogans, or other messages.

Computer 26 manages price changes within PLU file 32. PLU file 32 is stored within storage medium 30, which is preferably a fixed disk drive. Computer 12 obtains price information for EPLs 18 from PLU file 32. Computer 26 and computer 12 are here shown as two separate computers, although both EPL and PLU management functions can be performed using a single computer.

Turning now to FIG. 2, EPLs 18 are illustrated.

EPLs 18 each include battery 40, transmit and receive antenna 42, display 46, memory 47, EPL circuitry 48, and EPL auxiliary display sensing circuitry 50.

Battery 40 provides power to EPLs 18. Alternatively, other sources of power, such as solar power or external power connected through a cable, may be employed.

Transmit and receive antenna 42 receives price change and status messages from CBS 16.

Transmit and receive antenna 42 transmits responses to price change and status messages to CBS 16.

Display 46 displays price and possibly additional information. Display 46 is preferably a liquid crystal display (LCD).

Memory 47 stores price verifier information, EPL auxiliary display type number, and may additionally store promotional information. Preferably, the price verifier information is a checksum of the displayed price.

EPL circuitry 48 controls the internal operation of EPLs 18. EPL circuitry 48 includes EPL auxiliary display sensing circuitry 50, which determines whether an EPL auxiliary display is attached and, if so, its type. EPL auxiliary display sensing circuitry 50 includes display type recorders 52 for sensing the presence and type of auxiliary display 24. EPL circuitry 48 stores the binary type number that corresponds to signals recorded by display type recorders 52 in memory 47.

Figure 3A:
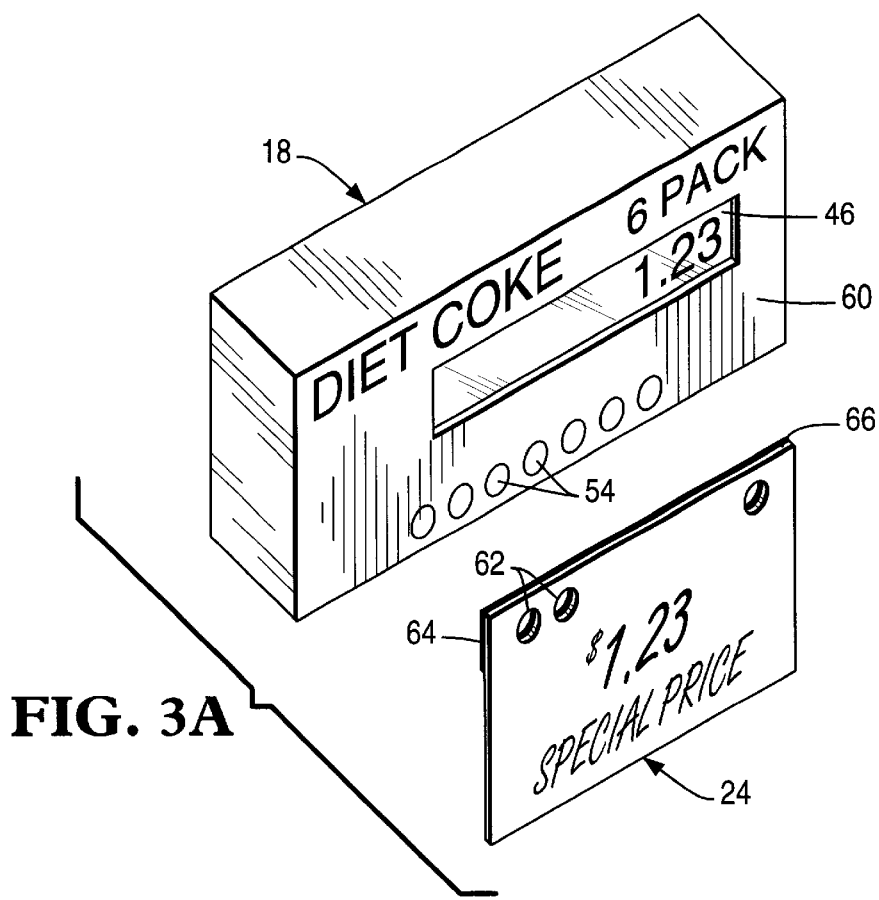
FIGS. 3A and 3B illustrate a first embodiment of the system of the present invention.
Figure 3B:
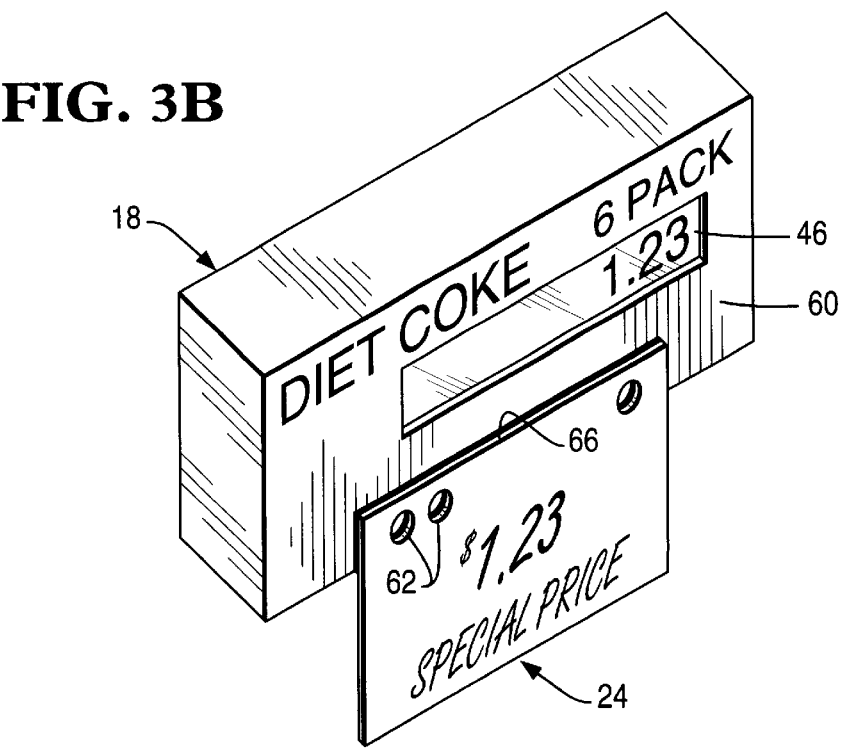

Turning now to FIGS. 3A and 3B, EPL auxiliary display 24 and a first embodiment of EPL auxiliary display sensing circuitry 50 are illustrated in more detail.

EPL auxiliary display 24 includes an adhesive rear surface 64 for attaching EPL auxiliary display 24 to front surface 60 of EPL 18. EPL auxiliary display 24 additionally includes one or more apertures 62 adjacent top edge 66 of auxiliary display 24. The number of apertures 62 indicates the type of EPL auxiliary display that is attached to EPL 18. Top edge 66 is aligned so as to center each of apertures 62 over their corresponding display type recorders 52.

EPL auxiliary display 24 may be attached through other methods, such as providing a retaining slot into which display 24 is inserted.

Display type recorders 52 preferably include a plurality of photosensors 54 along front surface 60 of EPL 18. Photosensors adjacent apertures 62 are exposed to surrounding light and produce electrical signals that are recorded as '1's by EPL circuitry 48. Photosensors that are obscured by auxiliary display 24 do not produce electrical signals and their outputs are recorded as '0's by EPL circuitry 48. Each type of auxiliary display 24 is identified by a number. Here, seven display type recorders 52 produce a seven-digit binary number, although other numbers of display type recorders 52 are envisioned.

Figure 4A:
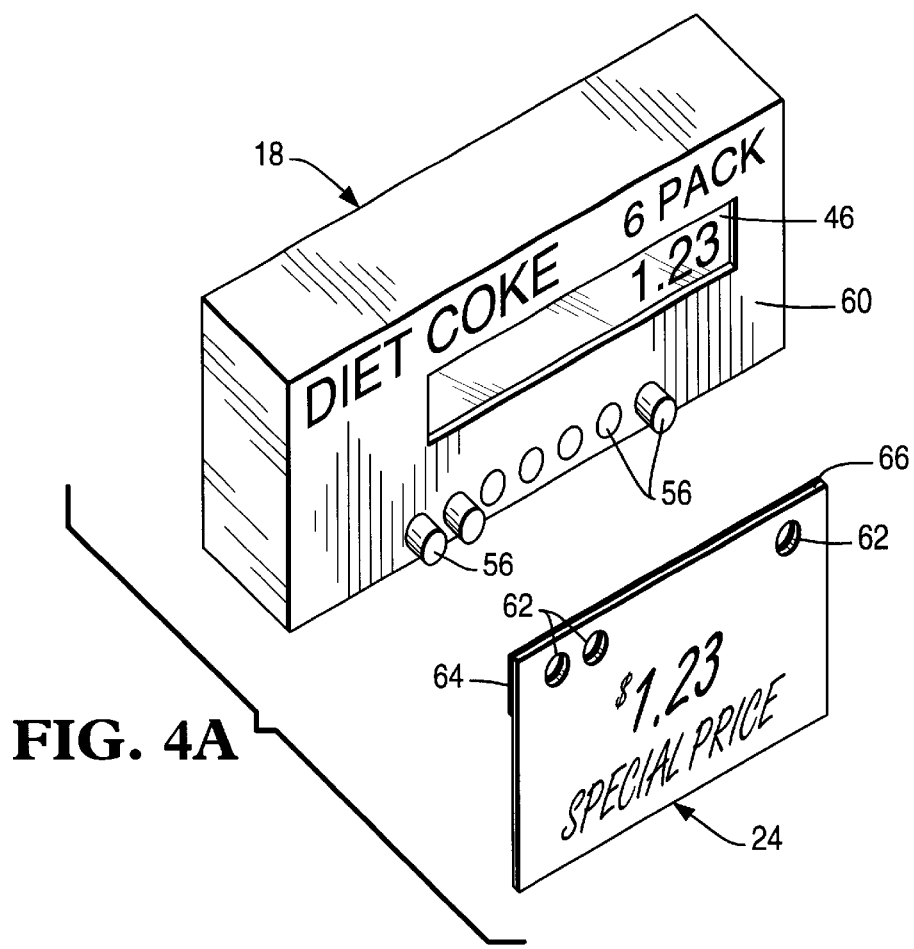
FIGS. 4A and 4B illustrate a second embodiment of the system of the present invention.
Figure 4B:
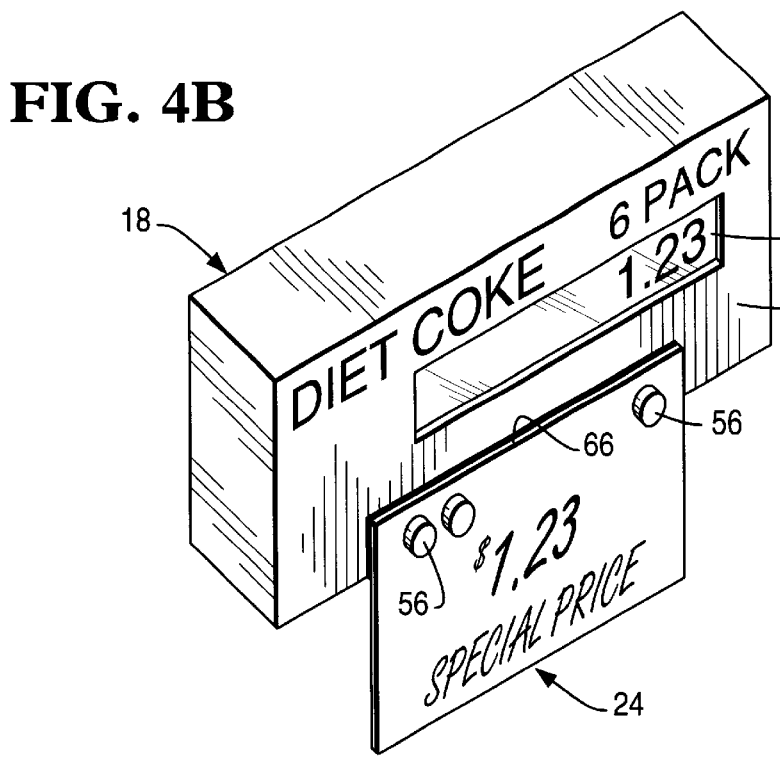

Turning now to FIGS. 4A and 4B, EPL auxiliary display 24 and a second embodiment of EPL auxiliary display sensing circuitry 50 are illustrated in more detail.

EPL auxiliary display 24 is similar to the first embodiment.

Display type recorders 52 preferably include a plurality of push buttons 56 along front surface 60 of EPL 18. Push buttons adjacent apertures 62 extend through apertures 62 and produce electrical signals that are recorded as '1's by EPL circuitry 48. Push buttons that are obscured by auxiliary display 24 are recessed within EPL 18 and do not produce electrical signals. Their outputs are recorded as '0's by EPL circuitry 48.

Figure 5A:
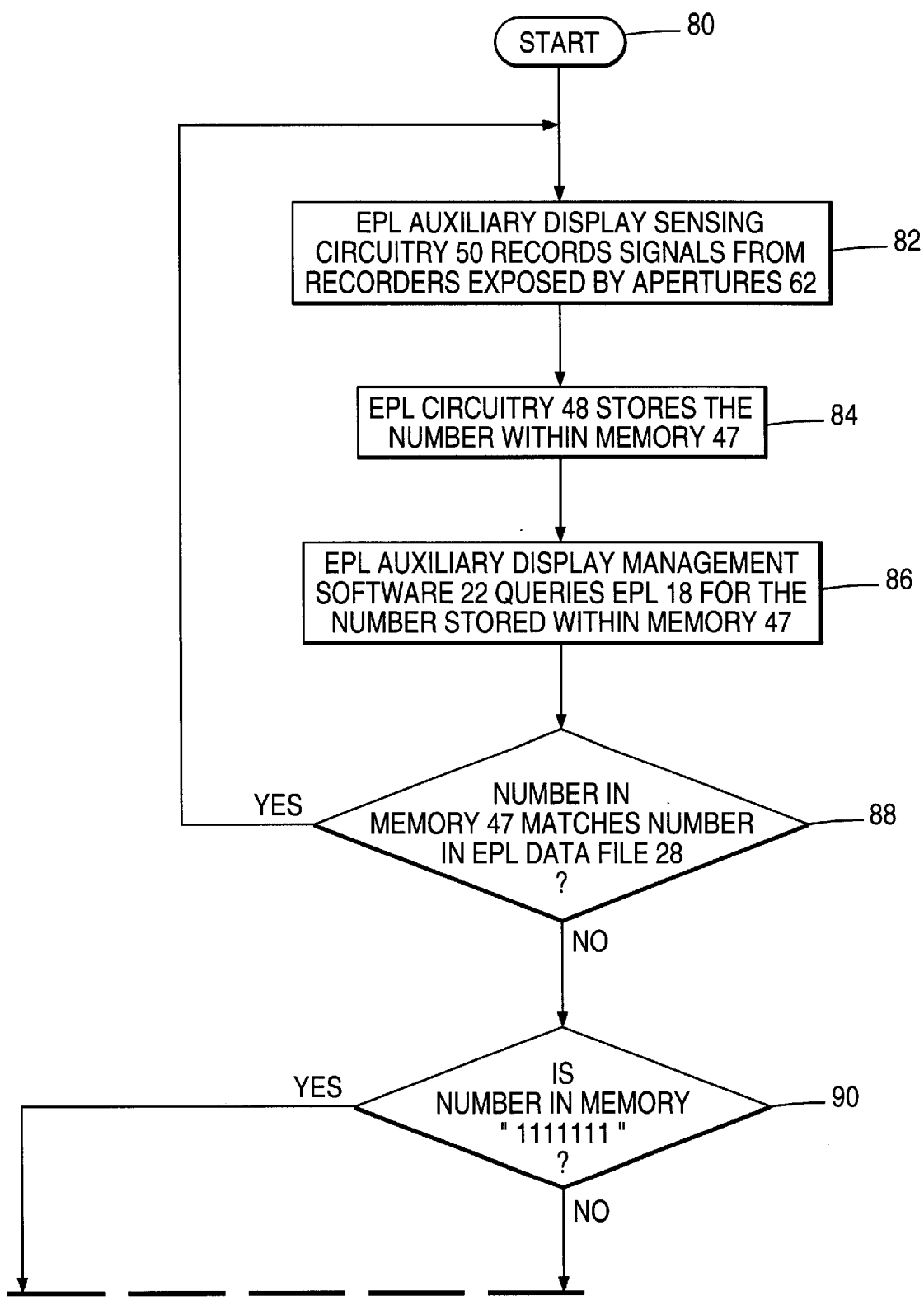
FIGS. 5A and 5B form a flow diagram illustrating a method for detecting an auxiliary display, including a method for determining the type of auxiliary display.
Figure 5B:
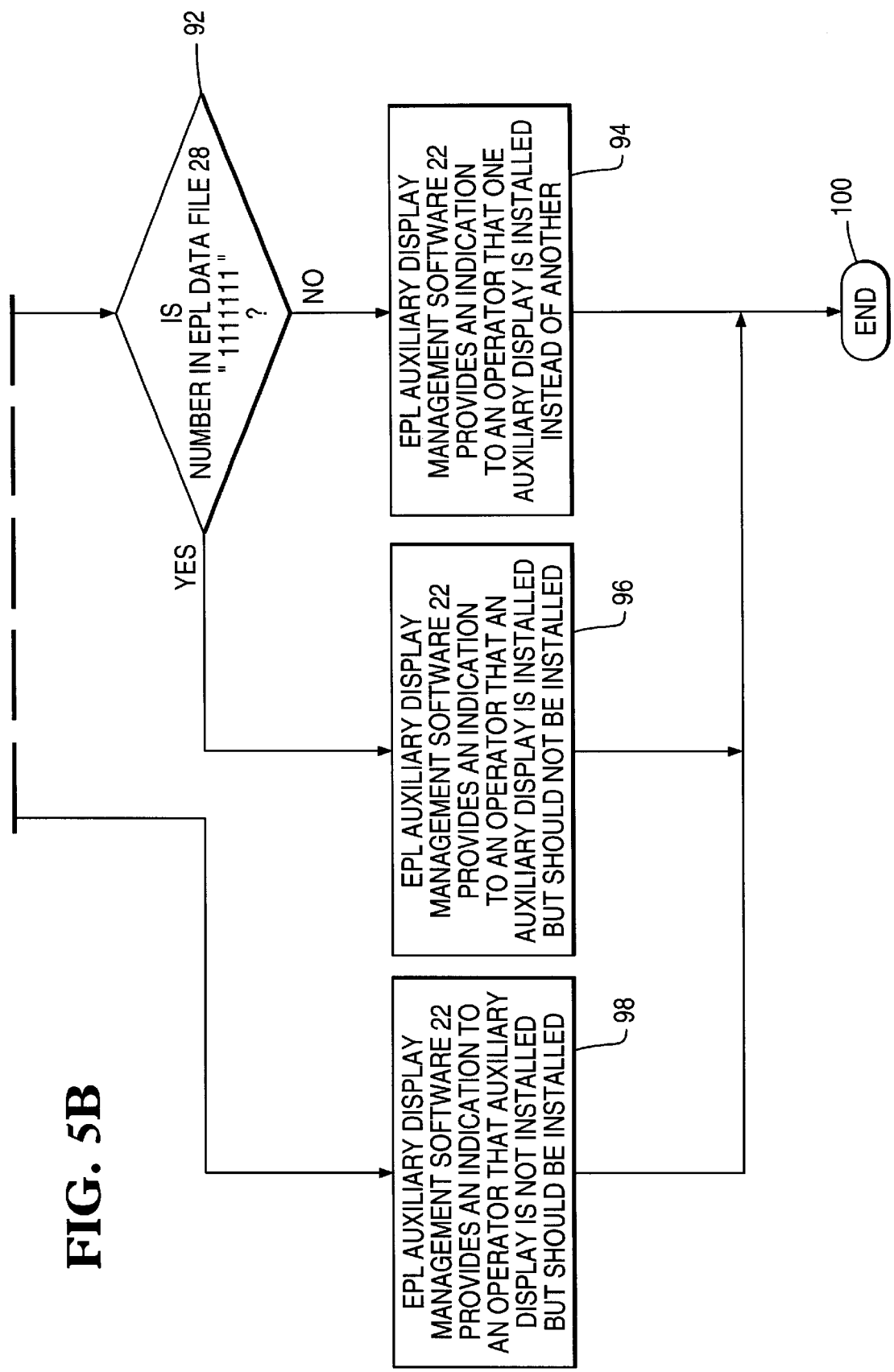

Turning now to FIGS. 5A and 5B, the operation of EPL system 10 is explained in more detail, beginning with START 80.

In step 82, EPL auxiliary display sensing circuitry 50 records signals from recorders exposed by apertures 62 or by no attached display.

In step 84, EPL circuitry 48 stores the number represented by the signals from the recorders in memory 47. The number in memory 47 represents the type of auxiliary display attached to EPL 18, if any.

In step 86, EPL auxiliary display management software 22 queries EPL 18 for the number stored within memory 47.

In step 88, EPL auxiliary display management software 22 compares the number stored within memory 47 with a number stored within EPL data file 28.

If the numbers match, the method returns to step 82 to continuously monitor EPL 18. This situation indicates that an auxiliary display is attached to EPL and it is the correct auxiliary display for the EPL, or that no auxiliary display is attached and no auxiliary display should be attached. When the number is a binary number, a binary number having all '1's within EPL data file indicates that no auxiliary display 24 should be attached.

If the numbers do not match, either an incorrect auxiliary display is attached to EPL 18, an auxiliary display is not attached when one should be attached, or an auxiliary display is attached when one should not be attached. Auxiliary display 24 may be removed by store personnel or customers. A fallen or removed auxiliary display 24 may be re-attached to the wrong EPL by store personnel or customers.

If the numbers match, the method returns to step 82 to continuously monitor EPL 18. This situation indicates that an auxiliary display is attached to EPL and it is the correct auxiliary display for the EPL, or that no auxiliary display is attached and no auxiliary display should be attached. When the number is a binary number, a binary number having all '1's within EPL data file indicates that no auxiliary display 24 should be attached.

Thus, if the numbers do not match, the method proceeds to step 90 in which EPL auxiliary display management software 22 determines whether the number stored within memory 47 is '1111111'. If it is, EPL auxiliary display management software 22 provides an indication to an operator that an auxiliary display is not installed, but should be installed, and the method ends in step 100.

If the number stored within memory 47 is not '1111111', then the method proceeds to step 92 in which EPL auxiliary display management software 22 determines whether the number stored within EPL data file 28 for that EPL is '1111111'. If it is, then EPL auxiliary display management software 22 provides an indication to an operator that an auxiliary display is installed, but should not be installed, and the method ends in step 100.

If the number stored within EPL data file 28 is not '1111111', then EPL auxiliary display management software 22 provides an indication to an operator that one auxiliary display is installed instead of another, and the method ends in step 100.

Advantageously, auxiliary display recognition system of the present invention maximizes market impact for a particular product by ensuring that the correct type of auxiliary display and promotional message are attached to an EPL associated with the product.

Although the present invention has been described with particular reference to certain preferred embodiments thereof, variations and modifications of the present invention can be effected within the spirit and scope of the following claims.

What is claimed is:

1. A system for utilizing a plurality of auxiliary displays of different types with each of the auxiliary displays of each type having a type designation, recognizing the type of an auxiliary display attached to an electric price label, and helping to ensure that the correct type of auxiliary display is attached to the electronic price label comprising:

a number of auxiliary display recorders which sense a number of indicators on the auxiliary display;

wherein the indicators are arranged in a predetermined pattern which uniquely identifies the type designation for the auxiliary display; and circuit means coupled to the auxiliary display recorders for determining the type designation of the auxiliary display from the pattern;

wherein the auxiliary display recorders comprise a number of push button switches;

wherein the indicators comprise a number of apertures up to the number of push button switches through which push button switches protrude to provide the signals.

* * * * *